Jan. 16, 1934.     T. A. MITCHELL     1,943,330
METHOD AND APPARATUS FOR THE INTERTREATMENT OF LIQUID AND SOLID MATERIALS
Filed Sept. 25, 1929
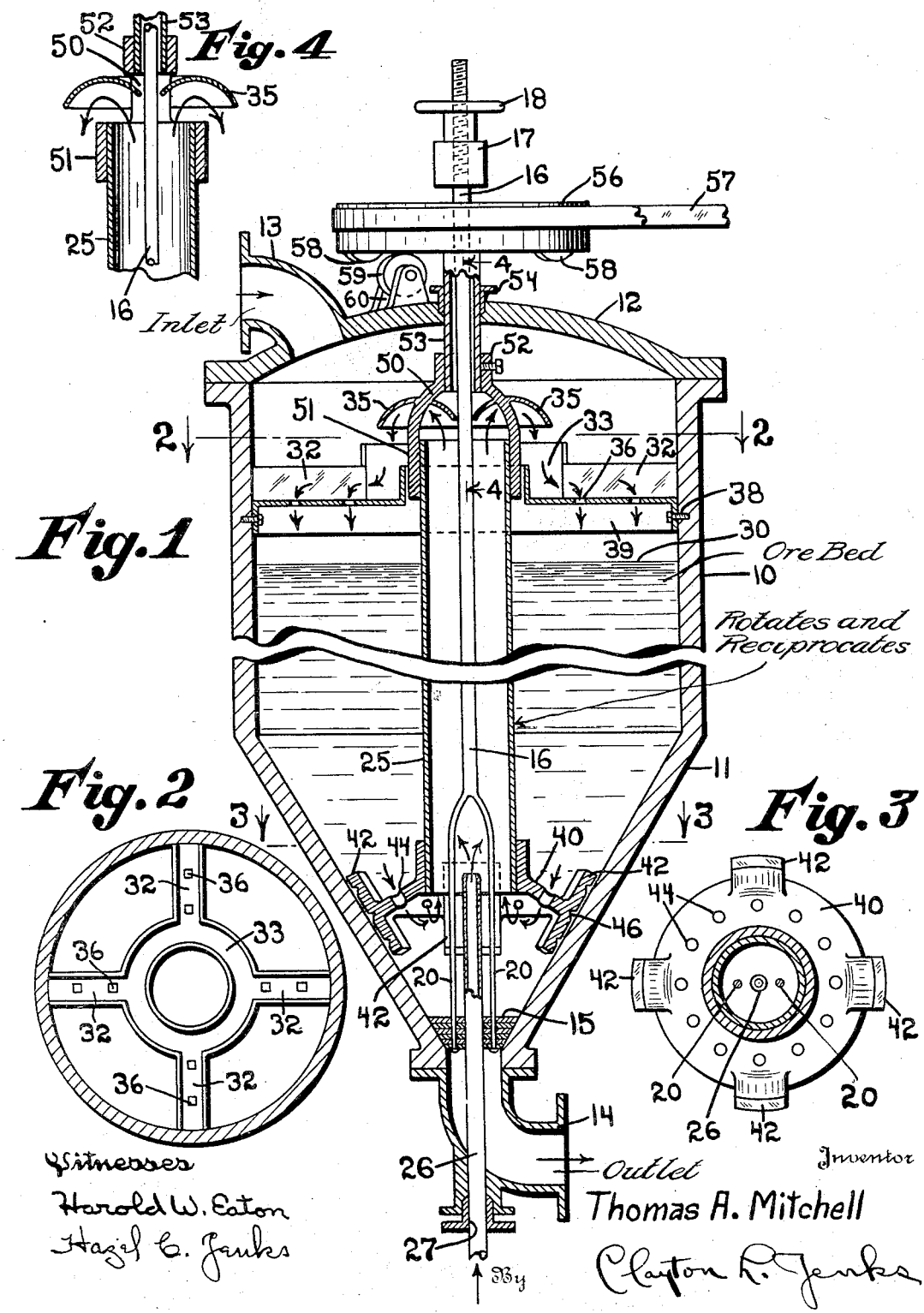

Patented Jan. 16, 1934

1,943,330

UNITED STATES PATENT OFFICE 1,943,330

METHOD AND APPARATUS FOR THE INTER-TREATMENT OF LIQUID AND SOLID MATERIALS

Thomas A. Mitchell, Denver, Colo., assignor to Lafayette M. Hughes, Denver, Colo.

Application September 25, 1929
Serial No. 395,040

11 Claims. (Cl. 23—268)

This invention relates to a method of and an apparatus for leaching ore materials with a suitable solvent or leaching liquid.

An apparatus provided heretofore for leaching ores has comprised a tank within which is a centrally located vertical pipe, open at both ends. The leaching solution and ore are placed in the tank, and a blast of air is injected into the bottom end of the pipe to force the leaching liquid upwardly therethrough and to spread over the top of the ore bed and thus provide a continuous circulation of the liquid through the ore.

The primary object of this invention is to overcome the defects inherent in such apparatus and methods heretofore employed and to provide a method and an apparatus for efficiently leaching or otherwise treating various granular ore materials with liquids and particularly to insure that the liquid contacts with all of the solid material and acts in the minimum of time in effectively treating the same.

With this and other objects in view as will be apparent to one skilled in the art, my invention resides in the process steps and in the combination of structural parts set forth in the following description and covered by the claims appended hereto.

In accordance with my discovery I have found that an ore bed may be leached and the solution filtered more efficiently, if a filter bed, the major portion of which is stationary, is provided and provision is made for continuously renewing the surface of the ore bed during the leaching and filtering operation, and this is preferably accomplished by removing material from the bottom of the bed and placing it periodically or continuously on the top of the bed. This serves to re-form the bed and to prevent its clogging and obstructing the passage of the liquid or of opening up pores or channels through which the liquid may pass easily without making proper contact with the ore particles. To this end, I propose to remove material from the lower portion of the bed, and preferably by a device which rotates or reciprocates or is otherwise moved relative to the bottom of the bed, and thereby keep a portion of the ore material suspended in the liquid and moving upwardly to the top of the bed where it will be redeposited and thus be arranged in a new position for further treatment by the leaching liquid.

Referring more particularly to the drawing which illustrates one embodiment of the invention:

Figure 1 is a vertical section, partly broken away and partly in elevation of an apparatus arranged for leaching ores;

Fig. 2 is a cross sectional view on a reduced scale, taken on the line 2—2 of Fig. 1, but with the agitating apparatus and valve lifting rod removed so as to show the distributing troughs in the top of the tank;

Fig. 3 is a section on the line 3—3 of Fig. 1 showing the agitating apparatus, but with the tank walls removed; and Fig. 4 is a section taken on the line 4—4 of Fig. 1, which illustrates the construction of the liquid spreading device.

As shown in the drawing, the apparatus may comprise a tank 10 having a conically shaped bottom portion 11 and a removable member 12. A pipe 13 communicates with an opening in the cover 12 and serves for the entrance of fluid and ore materials to the tank and for the egress of air from the tank. An outlet pipe 14 communicates with the bottom of the tank, but the egress of material through this pipe is ordinarily prevented by a stopper 15. This stopper is moved by means of a pipe or rod 16 which slides through a stationary support 17 above the tank and may be adjusted vertically by means of the hand wheel 18 threaded onto the upper end of this rod. The lower end of the rod 16 has a yoke comprising two arms 20 which are fastened into the stopper 15.

In order to provide means for elevating the liquid from the bottom to the top of the tank, a vertical pipe 25 is supported centrally of the tank and an air injector pipe 26 is arranged to introduce a current of air into the lower end of the pipe 25. The air pipe passes through a packed opening 27 in the pipe 14 and the stopper 15 and between the two arms 20 of the rod 16 which operates the stopper. The air pipe ends a short distance above the bottom of the tank, as illustrated, and near the bottom end of the pipe 25, which is open at both its upper and lower ends so that the air blast driven upwardly through this pipe 25 may issue at its upper end and serve to move the column of water and other material upwardly through the pipe.

The tank is adapted to hold a bed of ore and a leaching solution therein, and the top 30 of the solution and ore bed is intended to be considerably below the top of the pipe 25. Above this ore bed 30 is a spreading device or launder arranged to receive any water and ore material that passes upwardly through the pipe 25 and distribute it over the top surface of the ore. This device may comprise four trough-shaped arms 32 projecting outwardly from and connected with a central annular trough 33 surrounding the pipe 25. Arranged above the annulus and over both the outer peripheral portion of the pipe 25 and the annular trough 33 is an annular distributing flange 35 which is so mounted that it will receive the upwardly moving column of water and cause it to be deflected and thrown outwardly, as illustrated by the arrows, into the annular trough 33, and from this trough the material will flow laterally into the branches 32 and then through holes 36 in the bottom of these troughs and onto the top of the ore bed. This trough member may be suitably fastened to the side of the casing, as by means of screws 38 passing through a flange 39 projecting downwardly from the bottom of the spreading troughs.

In order to insure removing ore from the bottom of the bed and causing it to be spread over the top, I provide an arrangement which serves to stir up or scrape material off from the lower portion of this bed and cause it to mingle with the column of liquid moving up the pipe 25. This preferably comprises a stirring device attached directly to the pipe 25, which is arranged to be reciprocated and rotated. Attached to the lower end of the pipe 25 is a scraper comprising an annular portion 40 shaped like the frustum of a cone which has feet or scrapers 42 extending at substantially right angles thereto and arranged so as to lie substantially in contact or parallel with the conical wall 11 of the tank. The annulus 40 has holes 44 therethrough for the passage of liquid and ore materials, but the annulus will, in the main, serve to support ore and hold the major portion thereabove and prevent its wedging down into the bottom of the tank. It will be appreciated that if the pipe 25 is rotated and reciprocated vertically, the scrapers 42 will revolve as well as move away from the cone-shaped sides of the tank periodically and thereby serve to remove a controlled amount of material from the bottom of the bed and cause it to pass downwardly between the inner side of the tank and the serrated bottom 46 of the scrapers 42. This loosened material is caught by the upwardly moving column of liquid and carried through the tube 25 and into the distributor arms 32 from which it is spread over and so renews the surface of the bed.

In order to support and reciprocate the pipe 25 and the agitator at the bottom thereof, the pipe may be suspended on a U-shaped yoke 50 which has a sleeve 51 at its lower end encircling and suitably fastened to the pipe. As illustrated, the spreading flange 35 may be suitably mounted on or formed as an integral part of the yoked member 50. This yoke is provided at its upper end with a sleeve 52 which surrounds and is fastened, as by a cap screw, to a further sleeve 53 mounted to slide through an opening in the central portion of the cover 12. This sleeve 53 is also arranged to rotate therein so as to rotate the pipe 25 and the agitating members attached thereto. The bearing 54 for the sleeve is a bushing fitted into the top of the cover 12. The rotation and reciprocation of the pipe 25 may be accomplished by fastening the upper end of the sleeve 53 to a pulley 56 which is rotatably driven by a suitable belt 57. On the under side of this pulley are suitably shaped cams 58 which are arranged to strike a set of rollers 59 periodically as they revolve about the center of the pulley. These rollers 59 (but one of which is illustrated) are rotatably mounted on lugs 60 projecting upwardly from the top of the cover 12. It will therefore be seen that when the pulley rotates it will periodically bump over the rollers 59 and cause the sleeve 53 and the pipe 25 to be raised as they rotate. The apparatus may be so timed and arranged that the scrapers will rise and fall about one inch several times per minute.

In accordance with the above description, it will be seen that a bed of finely divided or granular ore may be placed in the tank up to the level 30 as indicated and the leaching solution then poured in while the stopper 15 is fitted tightly in place. Upon passing a current of air upwardly through the air pipe 26 and into the lower end of the pipe 25, the leaching liquid is caused to move upwardly through this pipe while the air escapes through the outlet 13 as indicated by the arrow in Fig. 1. At the same time the bottom portion of the ore bed is acted upon by the rotating and reciprocating members 25 and 40 and a certain amount of the loose granular material is caused to slide down the wall 11 and move downwardly past the agitator 40. This granular material is then carried upwardly through the central pipe 25 and it and the leaching fluid are distributed into the troughs 32 and spread over the top of the filter bed. In this way, if any channels or large pores have formed throughout the ore bed and the solution has been running rather freely therethrough, the top of the bed is re-formed and the channels and pores are filled up so as to make the liquid flow more slowly through the ore bed and in better leaching contact therewith. It may also be noted that by using this method and arrangement of parts, one may employ a larger apparatus than heretofore considered practical and so treat more material at a time, and therefore more economically. The transfer of material from the bottom to the top of the bed avoids not only the formation of channels through the filter bed but also prevents dead spots from appearing, which hold saturated liquor and do not let it circulate.

When the ore has been leached sufficiently, then it is feasible to stop the rotation and reciprocation of the scraper 42 and permit the air to pass all of the floating particles of ore upwardly with the solution onto the top of the bed and thus form a stationary filter bed, after which the liquid may be drawn out through the outlet 14 and the bed of ore left in the tank. If desired, all of the liquid and ore may be withdrawn at one time and carried to other apparatus for subsequent treatment thereof.

Various modifications of the apparatus may be made within the scope of this invention and the process may be suitably changed as desired in accordance with the type of material being treated and the nature of the operation.

Having thus described my invention, what I claim as new and desire to secure by Letters Patent is:

1. The method of leaching a granular ore mass with a solution comprising the steps of forming a substantially stationary filter bed of the ore and repeatedly passing the leaching solution therethrough while removing ore from the bottom of the bed and elevating it and the solution to the top of the bed to re-form the same.

2. The method of leaching a granular ore mass with a solution comprising the steps of forming a substantially stationary filter bed of the ore and repeatedly passing the solution downwardly therethrough and elevating it to the top of the bed while continuously renewing the top of the ore bed during the leaching operation by depositing thereon loose ore which has been removed from the bottom of the bed.

3. The method of leaching a granular ore mass with a solution comprising the steps of forming a substantially stationary filter bed of the ore and repeatedly passing the solution downwardly therethrough and elevating it to the top of the bed, continuously removing a controlled amount of material from the bottom of the ore bed and returning such loosened ore from the bottom of the bed to the top thereof during the leaching operation.

4. The method of leaching a granular ore mass with a solution comprising the steps of forming a substantially stationary filter bed of the ore, repeatedly passing the leaching solution therethrough while removing ore from the bottom of the bed and returning it to the top and finally passing the liquid downwardly through the stationary bed, thus filtering the same.

5. The method of leaching a granular ore mass with a solution comprising the steps of forming a substantially stationary filter bed of the ore, repeatedly passing the solution therethrough while removing a controlled amount of material from the bottom of the ore bed and returning the ore loosened therefrom and the solution to the top of the bed, and finally filtering the liquid through the bed of ore.

6. A leaching apparatus comprising a tank adapted to hold a liquid and a bed of granular material therein, means for elevating liquid from the lower side of said bed to the top thereof, and a rotary member in the tank arranged to remove granular material from the bottom of the bed and means including an air injector to cause said material to be elevated with the liquid to the top of the bed.

7. A leaching apparatus comprising a tank having a bottom outlet, a pipe having an end communicating with the space at the top of the tank and an inlet end near said outlet, means for introducing air into the pipe for elevating liquid therethrough, and means for moving the pipe to agitate the material outside of the pipe so that material will be elevated with the liquid.

8. A leaching apparatus comprising a tank adapted to hold a bed of granular material, a vertical pipe having open ends near the top and the bottom of the tank, means to rotate and to reciprocate the pipe, agitators movable with the pipe to stir up the bottom of the bed, and means for elevating liquid and granular material through the pipe to the top of the bed.

9. The method of leaching an ore material comprising the steps of forming a filter bed of the ore material in a loose, granular condition and holding the major portion thereof stationary, and passing a leaching liquid through the bed, while continuously removing ore material from one side of the bed and returning it to the other to re-form the filter bed and so present the material for further treatment and cause a rapid passage of the liquid therethrough.

10. An apparatus for leaching ore material comprising a tank adapted to hold liquid and having an inlet and an outlet for rapidly introducing and removing granular ore material and a leaching liquid, means for holding the ore material as a substantially stationary bed so that the leaching liquid may pass readily therethrough, means for repeatedly removing the liquid from the under side of the bed and introducing it to the top of the bed for re-treatment thereof, a device for removing a controlled amount of ore material from the under side of the bed so that it will be conducted with the liquid to the top of the bed, means for distributing the ore material over the top of the bed, and means including a removable closure at the bottom of the tank for discharging the ore and solution from the apparatus.

11. An apparatus of the type covered by claim 10 in which means including a tube is provided for conveying the liquid and ore material from the bottom of the tank to the top and a positively actuated scraping device removes the controlled amount of ore material from the bottom of the bed and causes it to be conveyed to the tube for elevation therethrough.

THOMAS A. MITCHELL.